United States Patent
Brannon et al.

[11] Patent Number: 5,547,026
[45] Date of Patent: Aug. 20, 1996

[54] CROSSLINKED GUAR BASED BLOCKING GEL SYSTEM FOR USE AT LOW TO HIGH TEMPERATURES

[75] Inventors: Harold D. Brannon, Spring; Allan R. Rickards, Pinehurst; Brian B. Beall, Houston; Marshall G. Ault, Spring, all of Tex.

[73] Assignee: BJ Services Company, Tomball, Tex.

[21] Appl. No.: 424,832

[22] Filed: Apr. 19, 1995

[51] Int. Cl.$^6$ .......................... E21B 33/138; E21B 43/25
[52] U.S. Cl. .......................... 166/295; 166/294; 166/300; 507/211; 507/903; 507/921; 507/925
[58] Field of Search .................................... 166/294, 295, 166/300; 175/72; 507/211, 217, 903, 921, 925

[56] References Cited

U.S. PATENT DOCUMENTS

| | | | |
|---|---|---|---|
| 4,605,061 | 8/1986 | Jennings, Jr. | 166/63 |
| 4,649,999 | 3/1987 | Sandy et al. | 166/295 |
| 4,664,191 | 5/1987 | Jennings, Jr. | 166/276 |
| 4,679,629 | 7/1987 | Abdo et al. | 166/281 |
| 4,708,206 | 11/1987 | Jennings, Jr. | 166/281 |
| 4,749,041 | 6/1988 | Hodge | 166/308 |
| 4,750,562 | 6/1988 | Jennings, Jr. | 166/281 |
| 4,787,456 | 11/1988 | Jennings, Jr. et al. | 166/281 |
| 4,815,537 | 3/1989 | Jones | 166/270 |
| 4,848,464 | 7/1989 | Jennings, Jr. et al. | 166/270 |
| 4,899,818 | 2/1990 | Jennings, Jr. et al. | 166/270 |
| 5,103,913 | 4/1992 | Nimerick et al. | 166/308 |
| 5,201,370 | 4/1993 | Tjon-Joe-Pin | 166/300 |
| 5,207,778 | 5/1993 | Jennings, Jr. | 166/281 |
| 5,224,544 | 7/1993 | Tjon-Joe-Pin et al. | 166/295 |
| 5,226,479 | 7/1993 | Gupta et al. | 166/300 |
| 5,247,995 | 9/1993 | Tjon-Joe-Pin et al. | 166/300 X |
| 5,421,412 | 6/1995 | Kelly et al. | 166/300 X |
| 5,423,380 | 6/1995 | Johnston et al. | 166/295 |
| 5,439,057 | 8/1995 | Weaver et al. | 166/295 |
| 5,441,109 | 8/1995 | Gupta et al. | 166/300 |

*Primary Examiner*—George A. Suchfield
*Attorney, Agent, or Firm*—Arnold, White & Durkee

[57] ABSTRACT

High temperature blocking gel is shown for temporary workover operations. The blocking gel is prepared by blending a guar or derivatized guar polymer with an aqueous fluid. The mixing method employed mixes and pumps the guar polymer essentially unhydrated. The resulting lower viscosity minimizes friction pressure during placement.

12 Claims, 4 Drawing Sheets

CROSSLINKED GUAR BASED BLOCKING GEL SYSTEM FOR USE AT LOW TO HIGH TEMPERATURES

BACKGROUND OF THE INVENTION

1. Field of the Invention

The present invention relates to the art of the production of hydrocarbons from subterranean formations and, more specifically, to blocking gels of the type used in well bore operations for the production of hydrocarbons.

2. Description of the Prior Art

Occasionally, production from well bore operations must cease temporarily to perform auxiliary procedures such as repairs at different depths of a subterranean formation. The repairs are called workover operations. Workover operations frequently use heavy brines and other fluids to maintain pressure control within the reservoir. the fluids can leak-off into the production zone, causing damage which interferes with the efficient operation of the well.

Isolating the production zone, however, protects it from damage. Specific blocking materials, such as solid blocking agents or temporary blocking gels isolate the production formation. The solid blocking agents, for example Nylon or rubber balls, are injected into the fluid stream and seal the production formation by physically stopping up perforations in the formation. When the injection ends, the material is no longer held against the perforations and falls to the bottom of the well.

The use of temporary blocking gels successfully protects the production zone. Blocking gels formed by gelation of suitable polymers, such as appropriate polysaccharides produce a relatively impermeable barrier across the production formation. The barrier cordons off the production zone from the area undergoing the workover operations. These areas must remain separated until production is ready to resume.

Production resumes after removal of the blocking gel. The recovery of the blocking gel is accomplished by reducing the viscosity of the fluid to a low value such that it flows naturally from the formation under the influence of formation fluids and pressure. This viscosity reduction or conversion is referred to as "breaking" and is often accomplished by incorporating chemical agents, referred to as breakers, into the initial gel. Blocking gels have been used in low temperature zones for many years. However, certain problems have been associated with isolating high temperature subterranean zones which were mostly due to the insufficient or unstable rheological properties of the crosslinked blocking gels.

The present invention has as its object to provide an improved blocking gel which is suitable for use from low to relatively high temperatures greater than about 250° F. to enable temporary isolation of the producing zone for an extended period of time.

Another object of the invention is to provide such a blocking gel which can be removed at any time without leaving damaging polymeric residue in the subterranean formation.

Another object of the invention is to provide a high temperature blocking gel for temporary workover operations which utilizes a guar polymer which is more temperature stable and which provides improved rheological characteristics over previously known cellulose polymer blocking gel systems.

SUMMARY OF THE INVENTION

In the method of the present invention, a blocking gel is formed for use within a well bore within a subterranean formation. A gellable blocking fluid is formed by blending together an aqueous gelled fluid containing up to about 100 pounds per 1000 gallons of a hydrated polymer selected from the group consisting of guar and guar derivatives, the aqueous gelled fluid having added thereto from about 10 to 300 pounds most preferably from about 20 to 250 pounds, per 1000 gallons of aqueous fluid of said selected polymer in an unhydrated, particulate form.

The gellable blocking fluid will also preferably have added thereto a suitable crosslinking agent for crosslinking a hydratable polymer to form a polymer gel and a gel breaker for producing a controlled break of the gel.

The breaker can be an enzyme breaker which is provided as an original source within the formulated gellable blocking fluid or which is applied as an additional breaker to the previously crosslinked polymer gel. After applying the blocking gel to the desired formation interval, the original and/or additional enzyme breaker is allowed to degrade the crosslinked polymer, whereby the fluid can be removed from the subterranean formation to the well surface. Because the fluid is mixed and pumped partially hydrated, it has a low viscosity which minimizes friction pressures and which allows placement using coiled tubing.

The blocking gel can also be used for blocking nonproductive, thief zones, for example to prevent lost circulation during drilling operations. In such cases, the blocking fluid would not generally require the addition of an enzyme breaker, but would remain as a semi-permanent blocking material.

Additional objects, features and advantages will be apparent in the written description which follows.

DETAILED DESCRIPTION OF THE INVENTION

Figure 1:
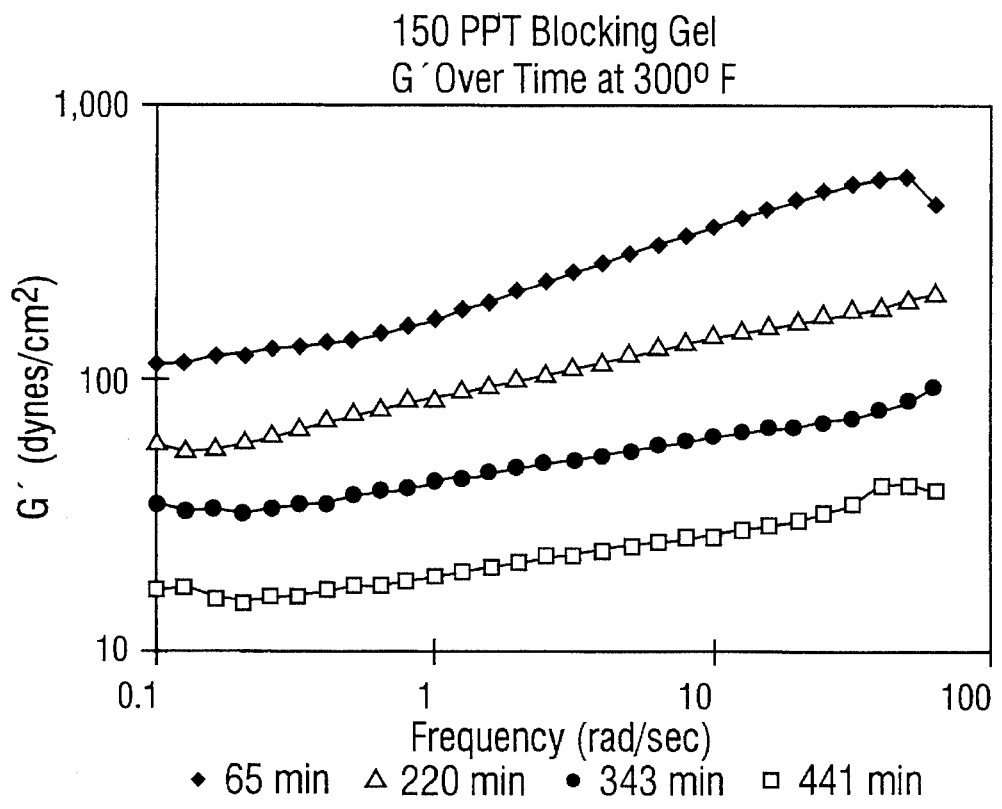
FIG. 1 is a graph of the energy storage modulus, G', over time at 300° F. for a blocking gel prepared with prehydrated polymer.

In order to practice the method of the invention, an aqueous blocking gel is first prepared by blending a hydratable polymer into an aqueous fluid. The aqueous fluid could be, for example, water, brine or water alcohol mixtures. A number of hydratable polymers are familiar to those in the well service industry. These polysaccharides are capable of gelling in the presence of a crosslinking agent to form a gelled base fluid. For example, hydratable polysaccharides include the galactomannan gums, guars, derivatized guars, cellulose and cellulose derivatives. Specific examples are guar gum, guar gum derivative, locust bean gum, caraya gum, carboxymethyl cellulose, cellulose, carboxymethylhydroxyethyl cellulose and hydroxyethyl cellulose.

Traditionally, cellulose based polymers have been preferred for use as blocking gels due to their low residue content after degradation. See, for example, U.S. Pat. No. 5,224,544, issued Jul. 6, 1993, to Robert M. Tjon-Joe-Pin, et al., entitled "Enzyme Complex Used For Breaking Crosslinked Cellulose Based Blocking Gels At Low To Moderate Temperatures", the disclosure of which is incorporated herein by reference.

Despite the fact that cellulose polymers have traditionally been preferred for blocking gel applications, guar polymers tend to be more temperature stable due to their structure. See Davidson, R. L., "Handbook Of Water Soluble Gums And Resins" McGraw-Hill Book Company, New York (1980), page 64. Thus, utilizing guar polymers in blocking gel applications presents the opportunity to extend the practical temperature limit of the prior art cellulose based gels. Recent studies and testing by independent laboratories have also shown that guar based blocking gels can be effectively removed from sand packs and from formations using conventional and recently developed enzyme breaker technology.

The preferred hydratable polymers for use in the present invention are thus guar gum and guar gum derivatives. The preferred gelling agents are guar gum, hydroxypropyl guar and carboxymethylhydroxypropyl guar. The most preferred hydratable polymer for the present invention is carboxymethylhydroxypropyl guar having a stability across a pH range from about 3.0 to 12.0 at temperatures in the range from 70° F. to 275° F. and higher. The hydratable polymer is added to the aqueous fluid in the range from about 0.5 to about 1.5% by weight based on the total weight of aqueous fluid.

In addition to the hydratable polymer, the blocking gel fluids of the invention can include a crosslinking agent. The crosslinking agent can be any of the conventionally used crosslinking agents which are known to those skilled in the art. For instance, in recent years, gelation of the hydratable polymer has been achieved by crosslinking these polymers with metal ions including aluminum, antimony, zirconium and titanium containing compounds including the so-called organotitanates. See, for example, U.S. Pat. No. 4,514,309. Transition metals are preferred. Zirconium crosslinking agents are most preferred.

In the case of zirconium crosslinkers, the crosslinking agent is any material which supplies zirconium ions in solution. Thus, the crosslinking agent can be any convenient source of zirconium ions. A preferred crosslinking additive is a zirconium chelate such as sodium zirconium lactate. This crosslinking additive is selected from a group of zirconium compounds preferably present in the range from about 0.005 to about 1.0% by weight of the aqueous fluid. Preferably, the concentration of cross-linking agent is in the range from 0.015 to about 0.1% by weight based on the total weight of the aqueous fluid.

Breakers commonly used in the industry for this particular application include chemical oxidizers such as persulfates, oxidizer-antioxidizer mixtures such as persulfates and triethanolamine and organic materials such as sucrose or polyglycolic acid. However, the present invention preferably utilizes an enzyme breaker system which is a mixture of highly specific enzymes which, for all practical purposes, completely degrade the polysaccharide backbone of the cross-linked blocking gel. The enzyme breakers can be internally incorporated within the gel, externally applied to the gel or a mixture of both. When the enzyme breakers are added depends upon the conditions of the procedure. The preferred method of application is a mixture of both of the above techniques.

The preferred enzyme breakers of the invention are hydrolases that are stable in the pH range from about 2.0 to 11.0 and remain active at a pH above about 8.0. The same enzymes are active at low to high temperatures of about 50° F. to 275° F. and above. The preferred enzyme breakers are specific to hydrolyze greater than about 90% of the guar polysaccharide backbone. The enzymes attack the mannosidic and galactomannosidic linkages in the guar backbone, breaking the backbone into monosaccharide and disaccharide fragments. Under some conditions, the enzymes break the polysaccharide backbone completely into monosaccharide fragments. The preferred enzymes are gammanase hydrolases collectively called galactomannase and they specifically hydrolyze the 1,6-$\alpha$-D-galactomannosidic and the 1,4-$\beta$-D-mannosidic linkages between the monosaccharide units in the guar backbone respectively. One preferred galactomannase is commercially available from Novo Nordisk of Norway as "Gammanase 1.5 L." The preferred concentration of galactomannase is 1:2 (weight/weight) solution of 1,6-$\alpha$-D-galactosidase and mannan indo-1,4-$\beta$-D-mannosidase, the galactomannase being present in the range from about 0.001 to 0.004% by weight, based on the total weight of aqueous fluid.

The method of the invention utilizes guar technology in a novel manner for blocking gel applications. The blocking gel is mixed and pumped partially hydrated. This allows mixing and pumping at low viscosity which minimizes friction pressures. The lower friction pressures allow placement of the blocking gel system using coiled tubing, where desired.

In formulating a typical blocking gel for use in low to high temperature formations, a guar or substituted guar polymer is added to an aqueous base fluid to provide a polymer loading in the range from about 0 to 100 pounds polymer per 1000 gallons of aqueous base fluid depending upon the required viscosity and other well bore conditions. As has been described and is customary in the industry, additional amounts of such additives as crosslinking agents comprising organometallic compounds or the like, pH control agents, crosslinking delay agents, antifoamers, surfactants and the like are added to the base fluid. Additionally, an alcohol such as methanol, ethanol, isopropanol may be added to the aqueous base fluid to retard hydration of the polymer, as is well known in the art.

At a time prior to pumping the solution into the well bore, additional relatively large amounts of unhydrated polymer are added to the aqueous base fluid in the amounts ranging from about 10 to 300 pounds, preferably about 20 to 250 pounds of such additional, unhydrated polymer per 1000 gallons of base fluid and the fluid is pumped through the well bore to the formation interval of interest. The blocking gel fluid is pumped at a rate sufficient to coat the formation interval.

In the examples which follow, a rheometrics pressure rheometer was used to evaluate the stability of a blocking gel at 300° F. The fluid was subjected to continuous sinusoidal oscillatory shear. The amplitude of oscillation was kept small to minimize shear degradation. This method is considered nondestructive, unlike steady shear measurements which typically degrade crosslinked gels, especially at higher temperatures. The stress component of oscillatory shear is composed of two parts, one in-phase with oscillation and the other out of phase. The in-phase component of stress is the energy storage modulus, G'. This modulus represents the elastic contributions of the fluid. The out-phase component is the energy loss modulus, G". It represents the viscosity contributions to the fluid. The dynamic viscosity is the quotient from the division of G' by frequency. A classical gel is defined as a semisolid that exhibits G' values that are both independent of frequency and exceed G" values.

Figure 2:
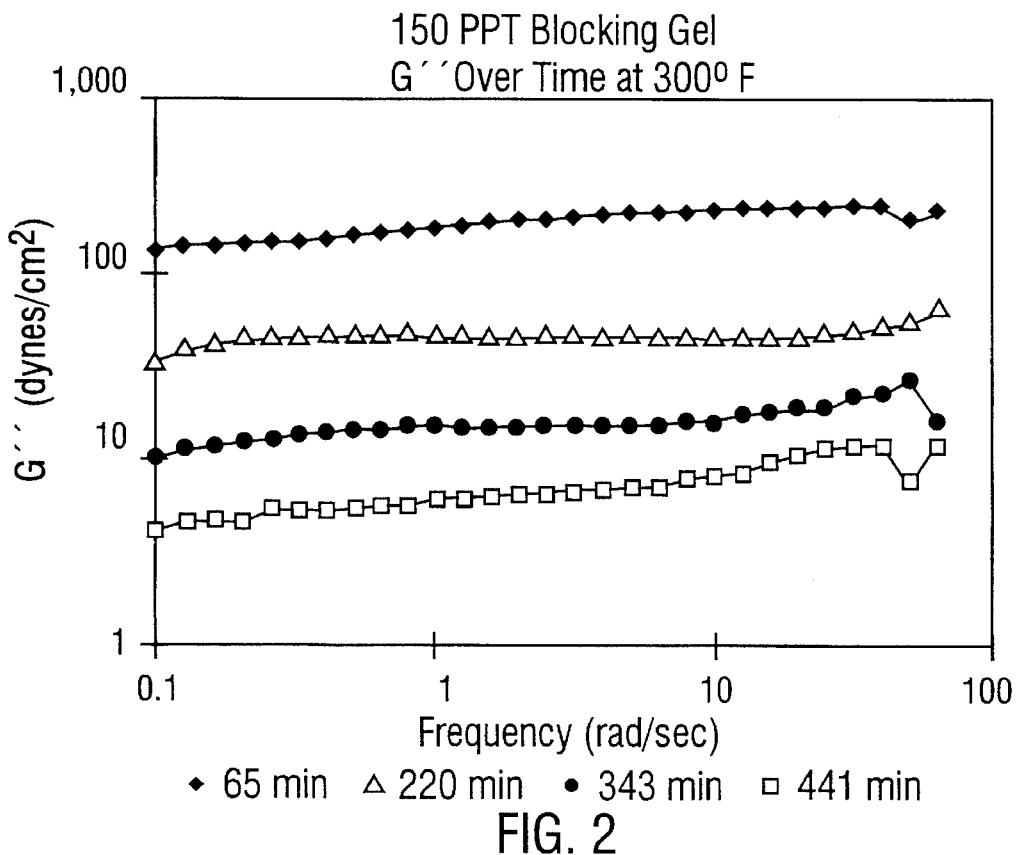
FIG. 2 is a graph of energy loss modulus, G", for the blocking gel of FIG. 1.

The preparation of the blocking gel was also evaluated. In the first example, 150 pounds of polymer per 1000 gallons was prehydrated prior to addition of crosslinker and heating. At temperature, the fluid was subjected to a dynamic rate sweep from 0.1 to 100 radians/second at 100% strain. The sweeps were conducted after 65, 220, 343 and 411 minutes of heating. The G' and G" values at 300° F. suggests that, at this temperature, the crosslinked junctions are beginning to disassociate. The loss of G' and G" values over time suggest polymer decomposition. These results are shown in FIGS. 1 and 2.

Figure 3:
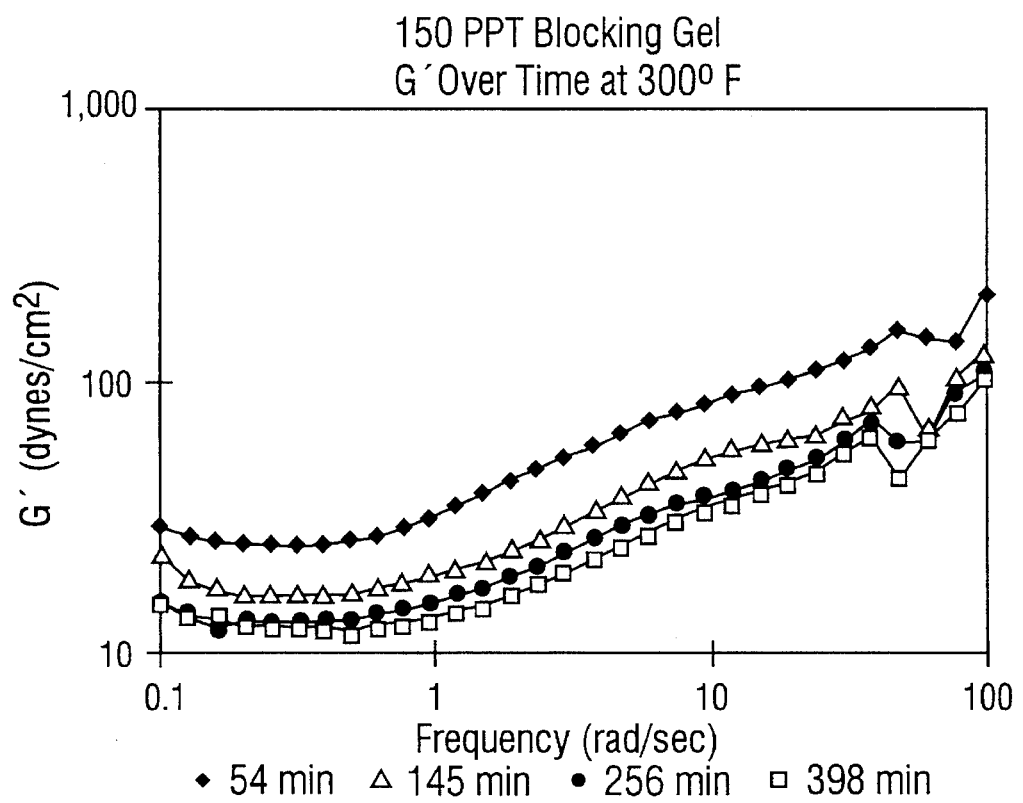
FIG. 3 is a graph of the energy storage modulus, G', over time at 300° F. for a blocking gel formulated according to the method of the invention.
Figure 4:
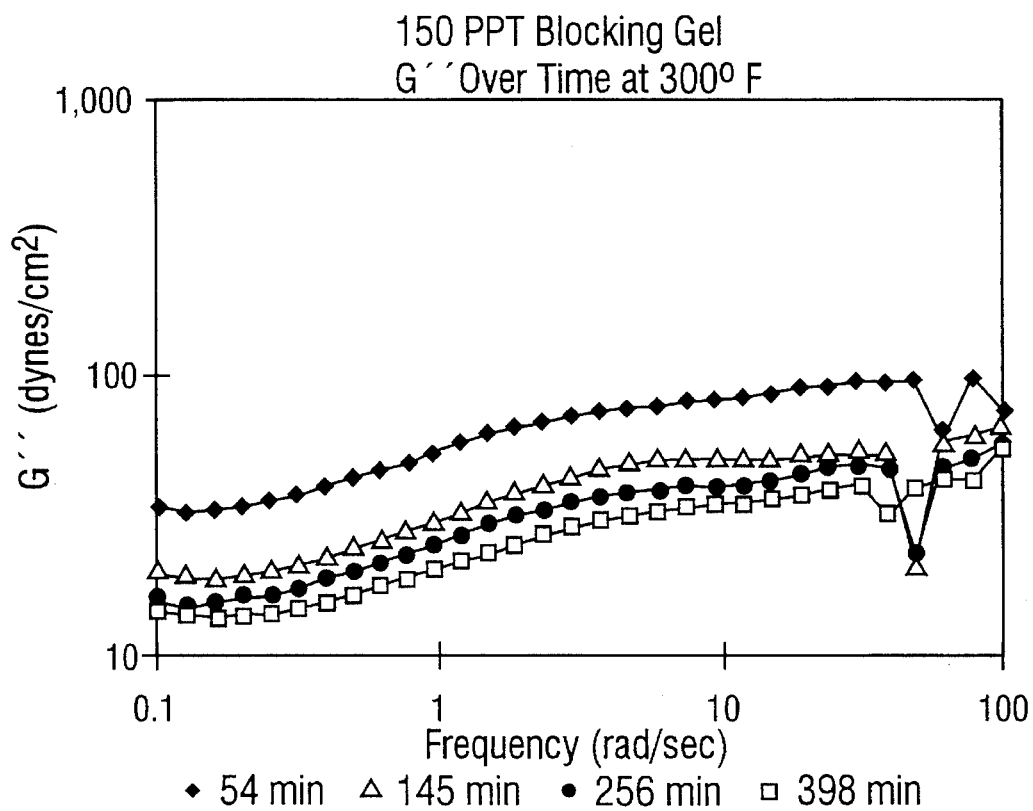
FIG. 4 is a graph of the energy loss modulus, G", for the blocking gel of FIG. 3.

In the second example, only 20 pounds of polymer per 1000 gallons was hydrated. The pH of the fluid was then raised above about 9.0 by the addition of a suitable buffer and the additional 100 pounds of polymer was added. Suitable buffers for pH adjustment include calcium oxide, magnesium oxide, ammonium hydroxide, or other well known oxides, hydroxides or basic materials. It is generally desirable to raise the pH of the fluid above about 9.0, most preferably in the range from about 10.0–11.0 to limit the hydration of the additional polymer. In the example under consideration, the additional polymer in the alkaline fluid did not hydrate and the solution remained thin. On addition of crosslinking agent and heat, the fluid finally viscosified. Dynamic rate sweeps were made after 50, 145, 256 and 398 minutes at 300° F. The G' values are much lower than those of the first test. The values are also frequency dependent suggesting that the fluid is not a true gel. After the first sweep, the G" values initially decline but afterward, the rate of decline is significantly reduced. Although less polymer was used, the G" values are also larger than those of the first test. The results are shown in FIGS. 3 and 4.

Figure 5:
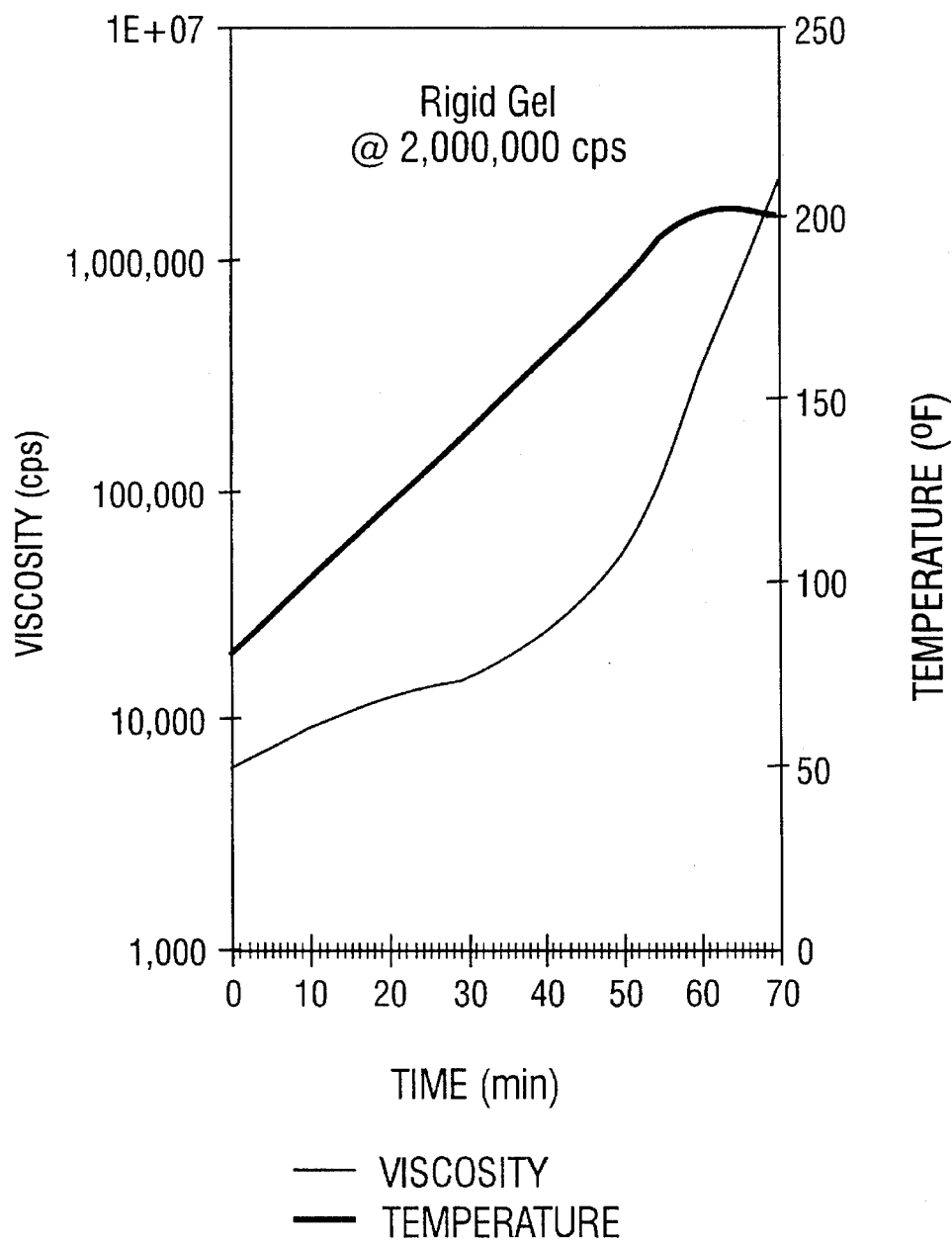
FIG. 5 is a graph of the viscosity and temperature profile of a blocking gel formulated according to the method of the invention.

It is apparent that the behavior of the fluids in the examples relates to the method of preparation. Specifically, the formulation of a blocking gel by adding additional unhydrated polymer to the base fluid results in improved rheological properties as well as temperature stability. It is theorized that the unhydrated polymer only swells in the alkaline water. Heating increases the degree of swelling. Before fully hydrating, however, crosslinking at the swollen particle surface occurs inhibiting the release of polymer from the particle surface to the water. This results in the formation of small, solvated polymer domains. The swelling causes the particles to become plastic like and deformable. In addition, the particle surfaces are sticky, allowing some association of these polymer domains. The particle's stickiness and the concentration of particles yield the higher viscosity fluid than that of the fluid made from fully hydrated polymer. A viscosity and temperature profile is shown in FIG. 5 for a guar based blocking gel formulated from 80 pounds per thousand gallons of aqueous fluid (ppt).

Figure 6:
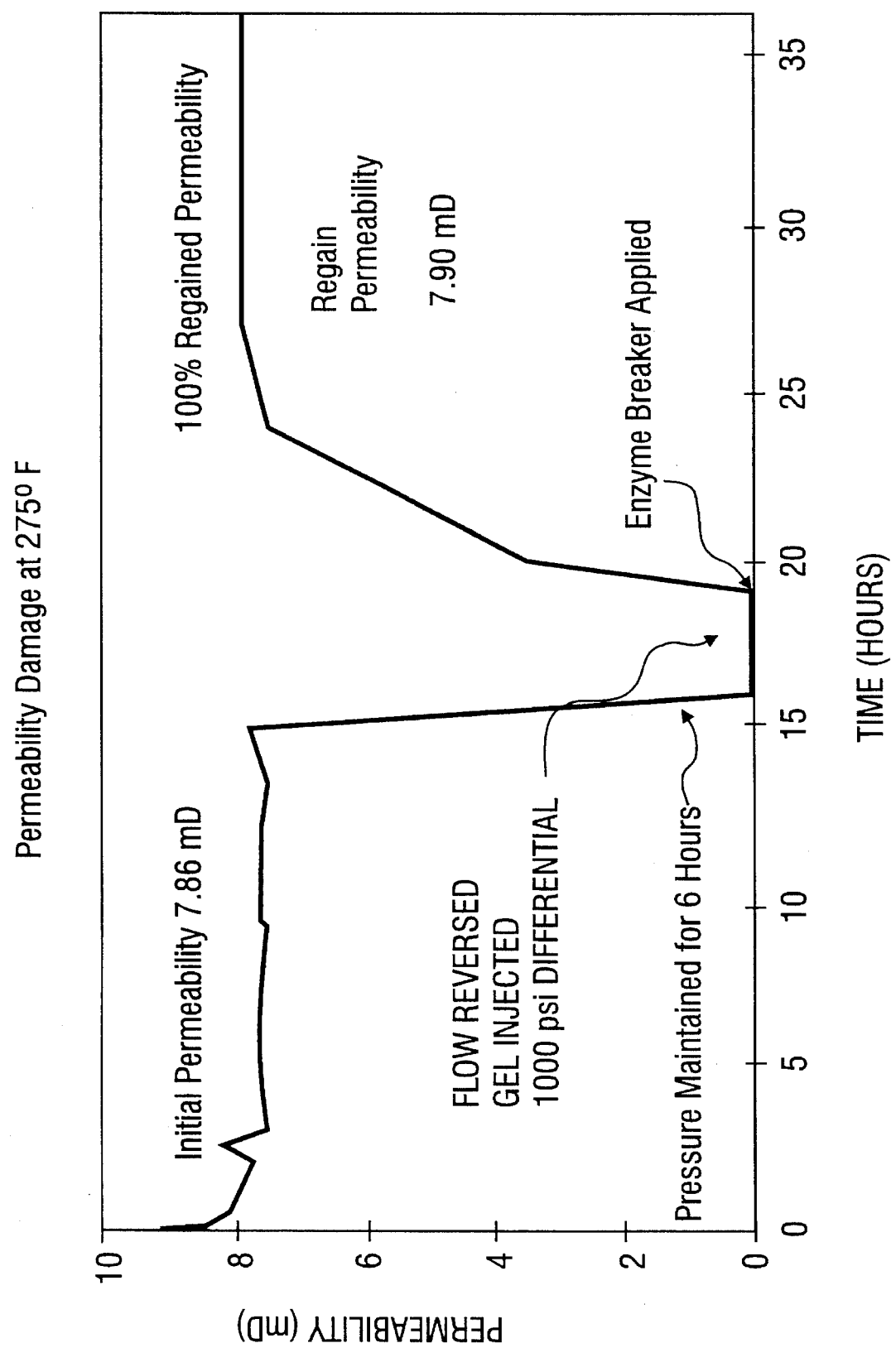
FIG. 6 is a graph of a core test used to measure permeability damage at 275° F. for a blocking gel of the invention.

Gel damage permeability tests were also performed using a computerized permeameter. These test assess the recovery of permeability of a core sample after degradation of the blocking gel fluid polymer. A test core is typically drilled from a sandstone formation sample. The initial permeability of the core sample was obtained using filtered 2% potassium chloride at 275° F. A pore pressure of 500 psi was maintained using a back pressure regulator. The initial permeability was 7.86 md. The direction of flow was reversed and a flow of 2% potassium chloride was established. The blocking gel was injected using a volume equal to approximately 1 gallon per linear foot in a 6.75 inch hole. A differential pressure of 1000 psi was maintained during the test period of 6 hours. The removal treatment consisting of an enzyme breaker solution was injected in the same direction as the blocking gel and allowed to stand for 1 hour. The final permeability was obtained in the original direction. Core test results show an extremely low leakoff, a spurt loss of 0.0 gal/ft$^2$ and $C_{iii}$ of 0.00335 ft/min$^{1/2}$. The core test shown in FIG. 6 was acidized prior to the blocking gel test. Regain permeability for this test was 7.90 md or 100% regain.

An invention has been shown with several advantages. The guar based blocking gel of the invention enables the temporary isolation of producing zones for extended periods of time at temperatures greater than 250° F. The blocking gels of the invention can be removed at any time without leaving damaging polymeric residue. The guar based blocking gels of the invention are effective and have desirable cleanup characteristics in high temperature subterranean zones.

The method of the invention allows higher polymer concentrations, above 150 pounds per 1000 gallons of aqueous fluid, which can be mixed and still have a pumping viscosity of below 30 cps at 511 sec$^{-1}$. The mixing procedure of the invention allows the blocking gel to reach deep formations with less friction pressure than the fully hydrated cellulose based blocking gels of the prior art. As the fluid is pumped, the higher temperatures encountered cause a transition from the delayed, partially hydrated state to a fully hydrated and crosslinked system. This technique yields more stability, lower fluid leakoff and less gel penetration into the formation matrix.

The guar based blocking gels of the invention possess stable rheologic properties at higher temperatures for longer period of times than their cellulose counterparts. Temporary isolation of the production zone is achieved without leaving damaging polymeric residue. The lower viscosities achieved allow the use of coiled tubing placement of the blocking gel, if desired.

The blocking gels can also be used to block non-productive, thief zones to prevent, for example, lost circulation during drilling operations.

While the invention has been shown in only one of its forms, it is not thus limited but is susceptible to various changes and modifications without departing from the spirit thereof.

What is claimed is:

1. A method of forming a blocking gel for use in well bore operations, the method comprising the steps of:

providing a gelled, aqueous base fluid containing up to 100 pounds per 1000 gallons of a hydrated polymer selected from the group consisting of guar and guar derivatives and pumping the gelled, aqueous base fluid into a subterranean formation to reach a desired treatment interval;

adding to the gelled aqueous base fluid immediately prior to pumping from about 20 to about 250 pounds per 1000 gallons of aqueous base fluid of said selected polymer in an unhydrated, particulate form; and further comprising the step of adding to the aqueous base fluid a suitable crosslinking agent for crosslinking the hydratable polymer to form a polymer gel.

2. The method of claim 1, further comprising the step of adding to the aqueous base fluid an original source of an enzyme breaker.

3. The method of claim 1, wherein the blocking gel is contacted with an enzyme breaker subsequent to placement of the gelled aqueous base fluid in the well bore.

4. A method of forming a blocking gel within a well bore adjacent a subterranean formation of interest, the method comprising the steps of:

first providing an aqueous base fluid containing up to 100 pounds per 1000 gallons of a hydrated polymer selected from the group consisting of guar and guar derivatives;

next adding to the aqueous base fluid from about 20 to about 250 pounds per 1000 gallons of aqueous base fluid of said selected polymer in an unhydrated, particulate form;

adding to the aqueous base fluid a suitable crosslinking agent for crosslinking the hydratable polymer to form a polymer gel and an original source of an enzyme breaker; and thereafter, pumping the aqueous base fluid into a subterranean formation to reach a desired treatment interval.

5. The method of claim 4, further comprising the steps of pumping the crosslinked polymer gel to a desired location within the well bore; and applying additional enzyme breaker to the previously crosslinked polymer gel.

6. The method of claim 5, wherein the enzyme breaker is a hydrolase.

7. A method of forming a blocking gel within a well bore within a subterranean formation, comprising the steps of:

formulating a gellable blocking fluid by sequentially first providing an aqueous gelled fracturing fluid containing up to 100 pounds per 1000 gallons of a hydrated polymer selected from the group consisting of guar and guar derivatives, followed by adding to the gelled aqueous solution immediately prior to pumping the fluid, from 20 to about 250 pounds per 1000 gallons of base fluid of said selected polymer in an unhydrated, particulate form;

adding a suitable crosslinking agent for crosslinking the hydratable polymer to form a polymer gel;

adding an enzyme breaker;

pumping the crosslinked polymer gel to a desired location within the well bore;

allowing the enzyme breaker to degrade the crosslinked polymer, whereby the fluid can be removed from the subterranean formation to the well surface.

8. The method of claim 7, further comprising the step of adjusting the pH of the base fluid in order to limit the hydration of unhydrated polymer.

9. The method of claim 7, wherein the blocking gel is prepared by blending an aqueous fluid and a hydratable guar polymer having repeating units of mannose and galactose linked by 1,4-$\beta$-D-mannosidic and 1,6-$\alpha$-D-galactomannosidic linkages.

10. The method of claim 9, wherein the enzyme breaker has an activity in the pH range of about 2.0 to 11.0 and wherein the activity is specific to attack the mannosidic and galactomannosidic linkages of the crosslinked polymer gel to reduce the polymer to a solution of mostly monosaccharide and disaccharide units.

11. The method of claim 10, wherein the enzyme breaker is effective to attack the 1,4-$\beta$-D-mannosidic linkage and the 1,6-$\alpha$-D-galactomannosidic linkage.

12. The method of claim 10, wherein the enzyme breaker is a 1:2 solution of 1,6-$\alpha$-D-galactosidase and mannan indo-1,4-$\beta$-D-mannosidase.

\* \* \* \* \*

UNITED STATES PATENT AND TRADEMARK OFFICE
CERTIFICATE OF CORRECTION

PATENT NO.    :    5,547,026

DATED         :    August 20, 1996

INVENTOR(S)   :    Harold D. Brannon et al

It is certified that error appears in the above-identified patent and that said Letters Patent is hereby corrected as shown below:

In the Abstract, the word --A-- should be added before the word High in the first line.
In column 1, line 17, change "the" to --The--.
In column 4, line 14, delete the word "gammanase" and add --galactomannan--.
In column 4, line 20, the word "Gammanase" should be in all caps as --GAMMANASE--.

Signed and Sealed this

Thirtieth Day of September, 1997

Attest:

BRUCE LEHMAN

Attesting Officer

Commissioner of Patents and Trademarks